US 6,591,890 B1

(12) United States Patent
Grubb et al.

(10) Patent No.: US 6,591,890 B1
(45) Date of Patent: Jul. 15, 2003

(54) SPEED REDUCER FOR RETRACTABLE SCREEN SYSTEMS

(75) Inventors: Darryl L. Grubb, Scottsdale, AZ (US); Ronald H. Scott, Phoenix, AZ (US)

(73) Assignee: Clear View Products, Inc., Anaheim, CA (US)

( * ) Notice: Subject to any disclaimer, the term of this patent is extended or adjusted under 35 U.S.C. 154(b) by 0 days.

(21) Appl. No.: 09/909,028

(22) Filed: Jul. 19, 2001

(51) Int. Cl.$^7$ .................................................. E06B 9/56
(52) U.S. Cl. ........................................ 160/296; 160/291
(58) Field of Search .......................... 160/291, 292, 160/293, 294, 295, 296, 305

(56) References Cited

U.S. PATENT DOCUMENTS

| | | | | |
|---|---|---|---|---|
| 3,700,363 A | * | 10/1972 | Sorensen et al. | 418/270 |
| 3,987,874 A | * | 10/1976 | Fuehrer et al. | 188/296 |
| 4,051,931 A | * | 10/1977 | Vignon | 188/296 |
| 4,535,829 A | * | 8/1985 | Fukuchi | 160/291 |
| 4,608,823 A | * | 9/1986 | Maze | 60/361 |
| 5,655,881 A | * | 8/1997 | Tanaka et al. | 416/180 |
| 6,082,432 A | * | 7/2000 | Kissinger | 160/290.1 |
| 6,155,328 A | * | 12/2000 | Welfonder | 160/313 |
| 2001/0042346 A1 | * | 11/2001 | Brioschi | 49/447 |

FOREIGN PATENT DOCUMENTS

JP         9-67987    *  7/1995    ............. 160/296 X

* cited by examiner

Primary Examiner—Bruce A. Lev
(74) Attorney, Agent, or Firm—Fulwider Patton Lee & Utecht, LLP

(57) ABSTRACT

A retractable screen mechanism having two tracks mounted on opposing sides of an opening and a screen with a screen material mounted on a frame having two flexible opposing sides corresponding to and adapted to engage the two tracks. A spool mechanism for winding up the screen extends between the flexible opposing sides and engages a third side of the frame and is biased to a wind up position. The spool mechanism has a speed reducer which comprises a resistance structure moving through a viscous fluid to reduce the speed of the biased screen when moving to the wind up position.

16 Claims, 3 Drawing Sheets

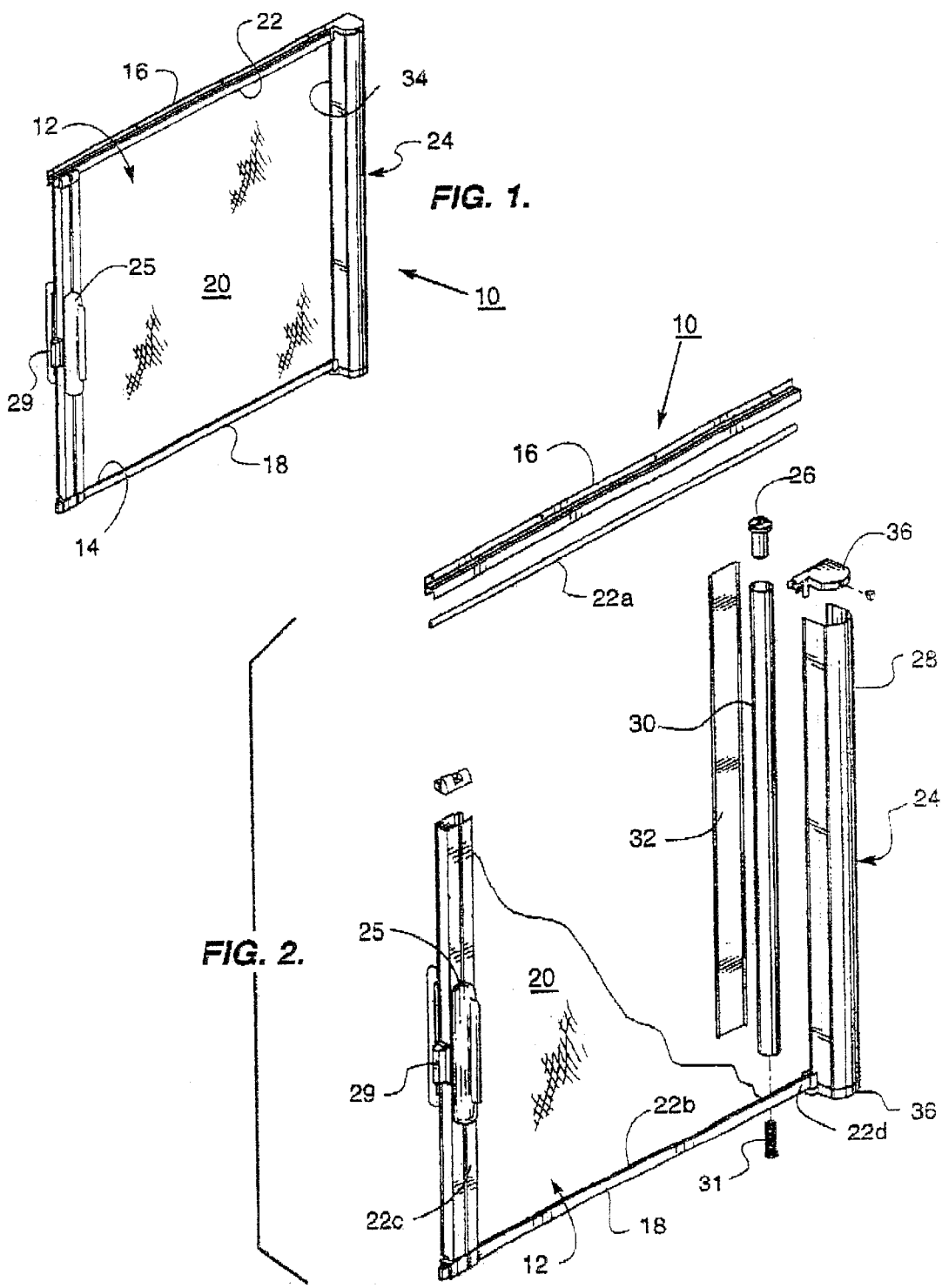

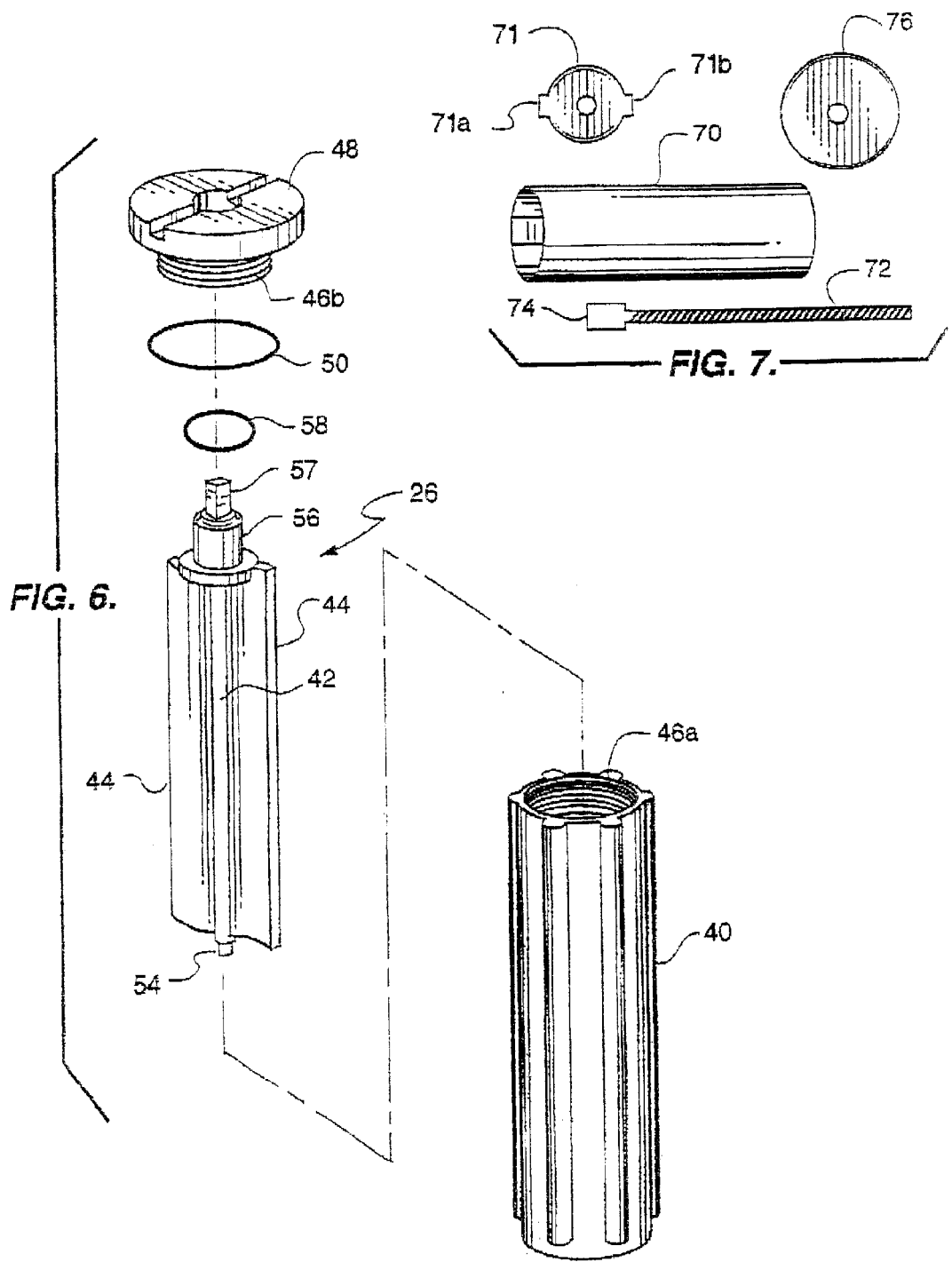

SPEED REDUCER FOR RETRACTABLE SCREEN SYSTEMS

TECHNICAL FIELD

This invention relates generally to the field of speed reducers used to slow movement, and, more particularly, to a speed reducer for a retractable doors and windows or any other retractable device used to control light and movement of people and/or insects.

BACKGROUND OF THE INVENTION

Retractable screen systems have become very popular in recent years. Such systems provide a screen which is typically extended and latched to cover an opening such as a door or a window. These systems employ a tracks to guide the screen and provide a seal against the elements. The screens are made of a flexible material mounted on a ridged frame adapted to engage the tracks but which allow the screen to be wound up on a spool when not in use. This provides more compact storage than either previously available sliding screens or hinged screen doors of the even earlier prior art.

However, the present day systems employ spools which are spring loaded and biased to the closed position. Thus, once the screen is unlatched, it will rewind to the spool automatically. Unfortunately, such spring loaded systems rewind very quickly and sometimes painfully catch fingers or other extremities. Thus, there is a need for a mechanism to reduce the retraction speed of such systems to avoid such difficulties.

The present invention meets this need.

SUMMARY OF THE INVENTION

It is an object of this invention to provide a speed reducer for a retractable doors and windows or any other retractable device used to control light and movement of people and/or insects.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1 is a perspective view of a screen system in a closed position;

FIG. 2 is an exploded perspective view of a screen system employing the present invention;

FIG. 6 is an exploded view of the speed reducer of FIG. 3; and

FIG. 7 is an alternate embodiment of the present invention.

DESCRIPTION OF THE PREFERRED EMBODIMENT

Figure 3:
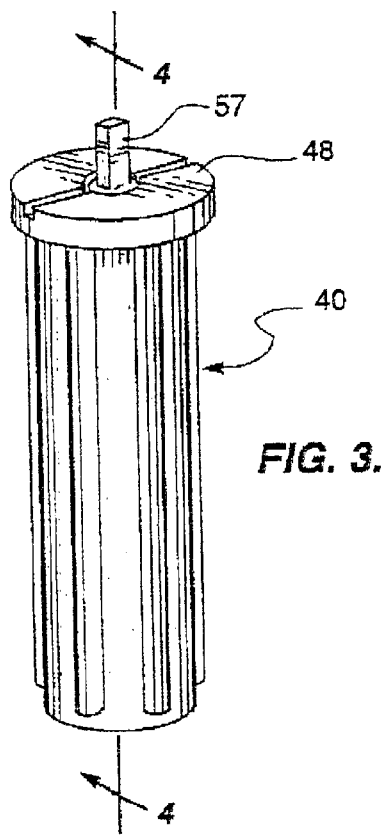
FIG. 3 is a close up view of one embodiment of a speed reducer of the present invention.
Figure 4:
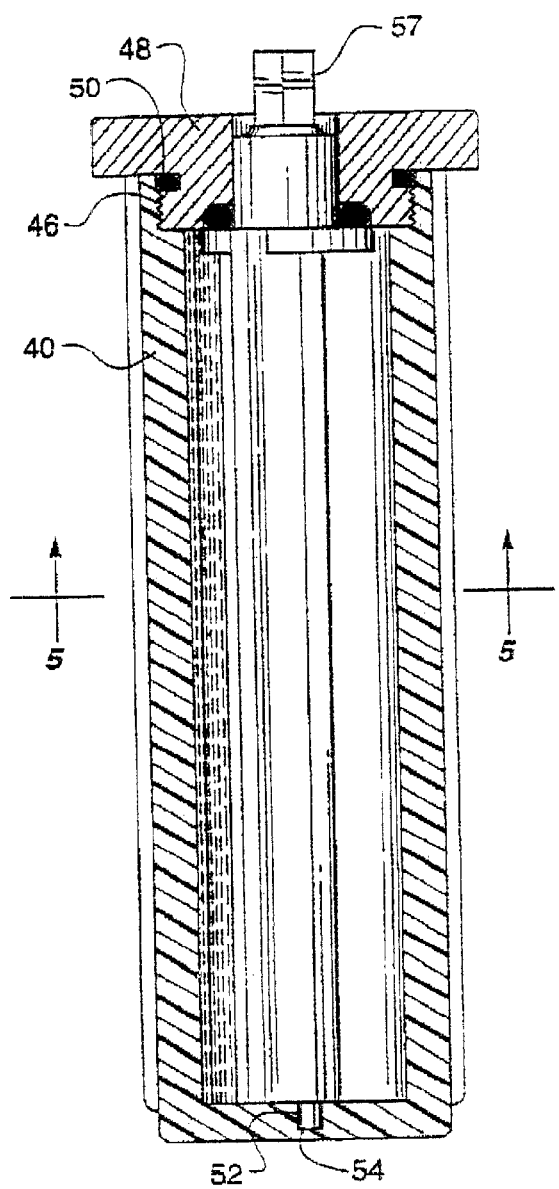
FIG. 4 is a cross sectional view of the embodiment of FIG. 3 taken along lines 4—4.

As best seen in FIGS. 2–6, the present invention is a speed reducer 26 incorporated into a screen system 10. A screen system 10 in an extended position is best seen in FIG. 1. Screen system 10 comprises a screen 12 which is typically extended and latched to cover an opening 14 such as a door or a window. Screen system 10 employs a first track 16 and an opposing second track 18 which are adapted to guide screen 12 and provide a seal against the elements.

Screen 12 is generally comprised of are made of a flexible screen material 20, for example, a fabric, mounted on a frame 22 having a flexible first side 22a and a flexible opposing second side 22b adapted to engage tracks 16 and 18. Frame 22 and material 20 allow screen 12 to be wound up on a spool mechanism 24 when not in use. The ability to wind up screen 12 provides for more compact storage than either previously available sliding screens or hinged screen doors of the even earlier prior art. A latch mechanism 25 mounted to one side 22c of frame 22, side 22c extending between sides 22a and 22b, engages a corresponding latching mechanism 29 mounted on the corresponding side of opening 14 holds screen 12 in the extended or unwound position illustrated in FIG. 1 when desired.

To move screen 12 to a rewound position whereby opening 14 is uncovered, latch mechanism 25 is disengaged by the user. Spool mechanism 24 is biased to the rewound position whereby once screen 12 is unlatched, screen 12 rewinds to spool mechanism 24 automatically.

As shown in FIG. 2, spool mechanism 24 comprises an elongated housing 28 having a U-shaped profile and a rotating axle 30 contained therein. A plate 32 covers the open side end of housing 28 except for an slot 34 (FIG. 1) while two caps 36 provide end support therefor. A side 22d of frame 22 opposite side 22c is attached to axle 30 while screen 12 extends through slot 34. Latch mechanism 25 itself prevents screen 12 from being completely rewound onto axle 30. Side 22c is, preferably, adapted to cover slot 34 to prevent entry of dirt, insects and the like when screen 12 is in rewound position.

Axle 30 engages a constant tension spring mechanism 31 at one end thereof. As discussed, spring mechanism 31 is biased to hold screen 12 in the rewound position. The mechanisms discussed to this point are well known in the prior art.

The present invention is the addition of a speed reducer mechanism 26 at the end of axle 30 opposite spring mechanism 31. In the prior art, speed reducer mechanism 26 is normally a bushing or the like (not shown) which allows for free rotation of axle 30 without speed reduction. The heart of the present invention is the use of a structure moving through a viscous fluid to reduce the speed of the screen 12 movements.

Turning now to FIGS. 3–6, the presently preferred embodiment of speed reducer mechanism 26 comprises a cylindrical, hollow ribbed housing 40 having a shaft 42 extending coaxially and rotatably mounted therewithin. A plurality of vane blades 44 extending laterally from shaft 42. Housing 40 includes threading 46a at one open end thereof which is adapted to mate with corresponding threading 46b on a cap 48 to close said open end. An o-ring 50 provides a seal between housing 40 and cap 48.

At the opposite end of housing 40, a recess 52 is adapted to receive an end 54 of shaft 42 and allow shaft 42 to rotate with respect to housing 40. A bushing 56 is mounted to the opposite end of shaft 42 and extends upwardly through cap 48. O-ring 58 in combination with cap 48 and bushing 56 provides a liquid proof seal between the interior and exterior of housing 40 while allowing shaft 42 to rotate with respect to housing 40. An upper end 57 of shaft 42 extends upwardly from housing 40.

Figure 5:
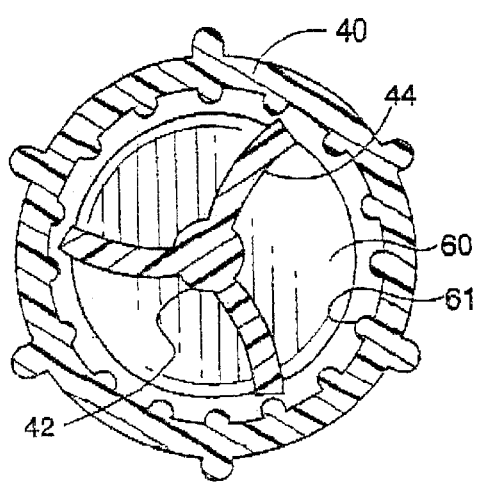
FIG. 5 is a cross sectional view of the embodiment of FIG. 4 taken along lines 5—5.

Housing 40 is filled with a liquid substance, preferably a viscous material 60 such as a hydraulic oil. The combination of vane blades 44 and viscous material 60 provides resistance to rotation of shaft 42 and housing 40. Further resistance is provided in the most preferred embodiment by adding ribs 61 extending inwardly from housing 40 as best seen in FIG. 5. Ribs 61 add turbulence to the flow of the viscous material 60 which increases the resistance thereof. To further add resistance, ribs 61 are bent slightly in one direction or the other.

As best seen in FIG. 5, vane blades 44 are not radially oriented but instead curve away from that radial orientation in the clockwise direction as viewed in FIG. 5. The curvature of blades 44 allows less turbulent hydraulic flow when vane blades 44 rotate in a counterclockwise direction as opposed to a clockwise direction. In the preferred embodiment, the counterclockwise direction is used to move screen 12 from the rewound position to the extended position while the added resistance is used to impede the movement of screen 12 from the extended position to the rewound position against the pull of spring 31.

Housing 40 is, preferably, mounted to the interior of axle 30 and rotates therewith. Upper end 57 is fixedly mounted to cap 36 and does not rotate. Thus, housing 40 and axle 30 rotate about a fixed shaft 42 to provide the reduction in speed.

Turning now to FIG. 7, an alternate embodiment of the present invention is illustrated. This embodiment includes a housing 70 having a cap 76 at one end thereof and a jackscrew 72 rotatably received within housing 70 with an upper end 74 extending through cap 76. A disk 71 having two tabs which ride in tracks along the interior of housing 70 is rotatably received on jackscrew 72 and, as jackscrew 72 rotates, travels upwardly and downwardly thereon depending upon the rotational direction of jackscrew 72. Housing 70 is filled with viscous material 60 (FIG. 5) providing resistance to the travel of disk 71 therethrough.

Although only certain embodiments have been illustrated and described, it will be apparent to those skilled in the art that various changes and modifications may be made therein without departing from the spirit of the invention or from the scope of the appended claims.

What is claimed is:

1. A retractable screen system, adapted to, when installed, cover an opening of a structure, the retractable screen mechanism comprising:

two tracks constructed to be mounted to said structure on opposing sides of the opening;

a screen comprising a screen material mounted on a frame having two flexible opposing sides corresponding to and adapted to engage the two tracks;

a spool mechanism extending between the flexible opposing sides and engaging a third side of the frame, the screen being adapted to wind up on the spool mechanism, the spool mechanism being biased to the wind up position; and the spool mechanism having a speed reducer comprising a resistance structure moving through a viscous fluid to reduce the speed of the biased screen when moving to the wind up position.

2. The retractable screen system of claim 1 further comprising:

a latch mechanism mounted to a fourth side of the frame opposite the third side, the fourth side extending between the two flexible opposing sides, the latch mechanism engaging a corresponding latching mechanism mounted on the corresponding side of the structure opening to latch the screen in an extended position.

3. The retractable screen system of claim 1 wherein:

the spool mechanism comprises an elongated housing having a U-shaped profile and a rotating axle contained therein and a plate partially covering the open side end of the elongated housing, the elongated housing and the plate defining a slot, the third side of the screen extending through the slot to engage the axle, the axle engaging a spring mechanism at one end thereof, the spring mechanism being biased to hold the screen in the wind up position, the speed reducer being mounted at the other end of the axle.

4. The retractable screen system of claim 3 wherein:

the speed reducer comprises a hollow housing having a shaft extending coaxially and rotatably mounted therewithin, the resistance structure being a plurality of vane blades extending laterally from the shaft to the sidewall of the housing, the viscous fluid being contained within the housing, the housing being mounted to and rotating with the axle, the shaft extending outwardly from the housing, the shaft being fixedly mounted to prevent rotation thereof, whereby the housing rotates about the shaft.

5. The retractable screen system of claim 4 wherein:

the viscous material is a hydraulic oil.

6. The retractable screen system of claim 4 wherein:

a plurality of ribs extend inwardly from the housing to add turbulence to the flow of the viscous fluid to increase the resistance thereof.

7. The retractable screen system of claim 6 wherein:

each of the plurality of ribs are bent slightly in one direction to further increase turbulence.

8. The retractable screen system of claim 4 wherein:

the vane blades curve away from a radial orientation in one direction to further increase turbulence.

9. The retractable screen system of claim 3 wherein:

the speed reducer comprises a housing having a cap at one end thereof and a jackscrew rotatably received within the housing, the jackscrew having one end extending through the cap, the housing being filled with the viscous fluid; and a disk having one or more tabs which ride in one or more tracks within the interior of the housing, the disk being rotatably received on the jackscrew and traveling upwardly and downwardly along said jackscrew as the jackscrew rotates.

10. The retractable screen system of claim 9 wherein:

the housing is mounted and rotates with the axle, the one end of the jackscrew being fixedly mounted, the housing rotating about the fixedly mounted jackscrew.

11. The retractable screen system of claim 1 wherein:

the screen material is a fabric.

12. A retractable screen system, adapted to, when installed, cover an opening in a structure, the retractable screen mechanism comprising:

two tracks constructed to be mounted on opposing sides of the opening;

a screen comprising a screen material mounted on a frame having two flexible opposing sides corresponding to and adapted to engage the two tracks;

a spool mechanism extending between the flexible opposing sides and engaging a third side of the frame, the screen being adapted to wind up on the spool mechanism, the spool mechanism being biased to the wind up position;

a latch mechanism mounted to a fourth side of frame opposite the third side, the fourth side extending between the two flexible opposing sides, the latch mechanism engaging a corresponding latching mechanism mounted on the corresponding side of the structure opening to latch the screen in an extended position; and the spool mechanism having a speed reducer comprising a resistance structure moving through a viscous fluid to reduce the speed of the biased screen when moving to the wind up position, the spool mechanism comprising an elongated housing having a U-shaped profile and a rotating axle contained therein and a plate partially covering the open side end of the elongated housing, the elongate housing and the plate defining a slot, the third side of the screen extending through the slot to engage the axle, the axle engaging a spring mechanism at one end thereof, the spring mechanism being biased to hold the screen in the wind up position, the speed reducer being mounted at the other end of the axle.

13. The retractable screen system of claim 12 wherein:

the speed reducer comprises a hollow housing having a shaft extending coaxially and rotatable mounted therewithin, a plurality of ribs extend inwardly from the housing to add turbulence to the flow of the viscous fluid to increase the resistance thereof, each of the plurality of ribs being bent slightly, in one direction to further increase turbulence, the resistance structure being a plurality of vane blades extending laterally from the shaft to the sidewall of the housing, the vane blades curving away from a radial orientation in one direction to further increase turbulence, the viscous fluid being contained within the housing, the housing being mounted to and rotating with the axle, the shaft extending outwardly from the housing, the shaft being fixedly mounted to prevent rotation thereof, whereby the housing rotates about the shaft.

14. The retractable screen system of claim 12 wherein:

the speed reducer comprises a housing having a cap at one end thereof and a jackscrew rotatably received within the housing, the jackscrew having one end extending through the cap, the housing being filled with the viscous fluid; and a disk having one or more tabs which ride in one or more tracks within the interior of the housing, the disk being rotatably received on the jackscrew and traveling upwardly and downwardly along said jackscrew as the jackscrew rotates, the housing being mounted and rotating with the axle, the one end of the jackscrew being fixedly mounted, the housing rotating about the fixedly mounted jackscrew.

15. A speed reducer for use in retractable screen systems having an axle biased to wind up a screen to a wind up position, the speed reducer comprising:

a housing having a cap at one end thereof and a jackscrew rotatably received within the housing, the jackscrew having one end extending through the cap, the housing being filled with a viscous fluid; and a resistance structure in the form of a disk having one or more tabs which ride in one or more tracks within the interior of the housing, the disk being rotatably received on the jackscrew and traveling upwardly and downwardly along said jackscrew as the jackscrew rotates, the resistance structure moving through the viscous fluid to reduce the speed of the screen when moving to the wind up position.

16. The speed reducer of claim 15 wherein:

the housing is mounted to and rotates with the axle, the one end of the jackscrew being fixedly mounted, the housing rotating about the jackscrew.

* * * * *

(12) EX PARTE REEXAMINATION CERTIFICATE (9305th)

United States Patent
Grubb et al.

(10) Number: US 6,591,890 C1
(45) Certificate Issued: Sep. 18, 2012

(54) SPEED REDUCER FOR RETRACTABLE SCREEN SYSTEMS

(75) Inventors: Darryl L. Grubb, Scottsdale, AZ (US); Ronald H. Scott, Phoenix, AZ (US)

(73) Assignee: Clear View Products, Southeast, Inc., Jacksonville, FL (US)

Reexamination Request:
No. 90/011,352, Nov. 23, 2010

Reexamination Certificate for:
Patent No.: 6,591,890
Issued: Jul. 15, 2003
Appl. No.: 09/909,028
Filed: Jul. 19, 2001

(51) Int. Cl.
*E06B 9/56* (2006.01)
*E06B 9/80* (2006.01)

(52) U.S. Cl. ............................ 160/296; 160/291
(58) Field of Classification Search .............. 188/290
See application file for complete search history.

(56) References Cited

To view the complete listing of prior art documents cited during the proceeding for Reexamination Control Number 90/011,352, please refer to the USPTO's public Patent Application Information Retrieval (PAIR) system under the Display References tab.

*Primary Examiner* — Robert M. Fetsuga

(57) ABSTRACT

A retractable screen mechanism having two tracks mounted on opposing sides of an opening and a screen with a screen material mounted on a frame having two flexible opposing sides corresponding to and adapted to engage the two tracks. A spool mechanism for winding up the screen extends between the flexible opposing sides and engages a third side of the frame and is biased to a wind up position. The spool mechanism has a speed reducer which comprises a resistance structure moving through a viscous fluid to reduce the speed of the biased screen when moving to the wind up position.

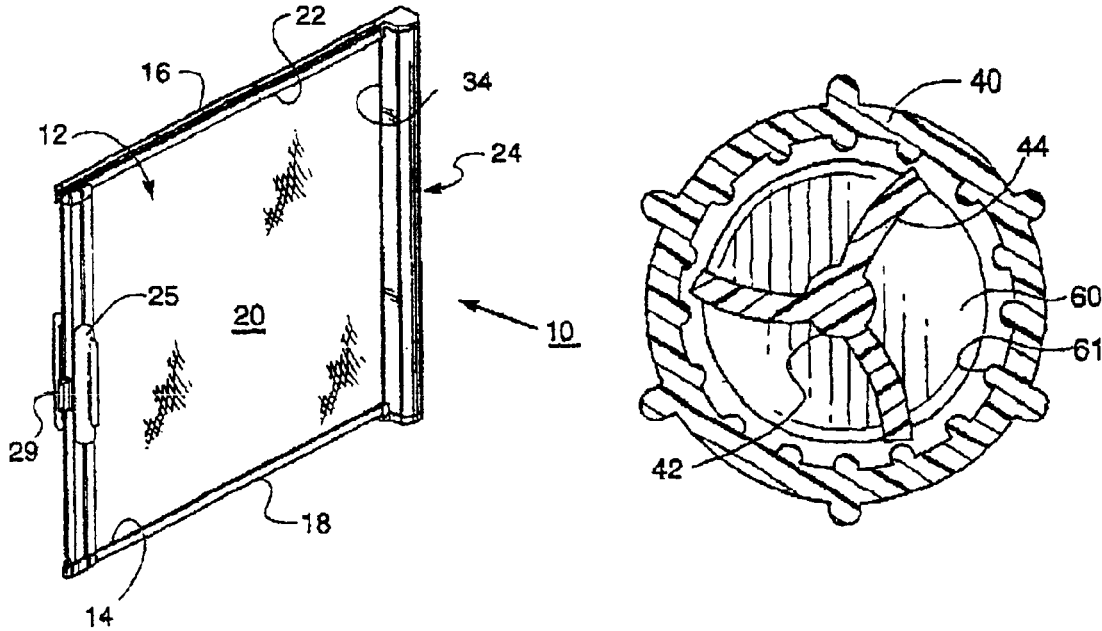

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 9, 10 and 14-16 are cancelled.

Claims 1, 4, 6, 12 and 13 are determined to be patentable as amended.

Claims 2, 3, 5, 7, 8 and 11, dependent on an amended claim, are determined to be patentable.

1. A retractable screen system, adapted to, when installed, cover an opening of a structure, the retractable screen mechanism comprising:
    two tracks constructed to be mounted to said structure on opposing sides of the opening;
    a screen comprising:
        a screen material mounted on a frame having two flexible opposing sides corresponding to and adapted to engage the two tracks;
        a spool mechanism extending between the flexible opposing sides and engaging a third side of the frame, the screen being adapted to wind up on the spool mechanism, the spool mechanism being biased to the wind up position; and
        the spool mechanism having a speed reducer comprising a resistance structure moving through a viscous fluid to reduce the speed of the biased screen when moving to the wind up position;
    *wherein said speed reducer includes a hollow housing having*
        *a plurality of inwardly extending ribs that extend inwardly from said hollow housing, and*
        *a shaft having a plurality of vane blades, wherein each of said vane blades includes a curved structure having a concave surface and an opposite convex surface, whereby rotation of said shaft in the direction of the concave surface provides greater resistance to rotation than rotation of said shaft in the direction of the convex surface.*

4. The retractable screen system of claim 3 wherein: [the speed reducer comprises a hollow housing having a] *said* shaft [extending] *extends* coaxially and *is* rotatably mounted [therewithin] *within said housing*, [the resistance structure being a] *said* plurality of vane blades extending laterally from the shaft to the sidewall of the housing, the viscous fluid being contained within the housing, the housing being mounted to and rotating with the axle, the shaft extending outwardly from the housing, the shaft being fixedly mounted to prevent rotation thereof, whereby the housing rotates about the shaft.

6. The retractable screen system of claim 4 wherein: [a plurality of] *said* ribs extend inwardly from the housing to add turbulence to the flow of the viscous fluid to increase the resistance thereof.

12. A retractable screen system, adapted to, when installed, cover an opening in a structure, the retractable screen mechanism comprising: two tracks constructed to be mounted on opposing sides of the opening; a screen comprising:
    a screen material mounted on a frame having two flexible opposing sides corresponding to and adapted to engage the two tracks;
    a spool mechanism extending between the flexible opposing sides and engaging a third side of the frame, the screen being adapted to wind up on the spool mechanism, the spool mechanism being biased to the wind up position;
    a latch mechanism mounted to a fourth side of frame opposite the third side, the fourth side extending between the two flexible opposing sides, the latch mechanism engaging a corresponding latching mechanism mounted on the corresponding side of the structure opening to latch the screen in an extended position; and
    the spool mechanism having a speed reducer comprising a resistance structure moving through a viscous fluid to reduce the speed of the biased screen when moving to the wind up position, the spool mechanism comprising an elongated housing having a U-shaped profile and a rotating axle contained therein and a plate partially covering the open side end of the elongated housing, the [elongate] *elongated* housing and the plate defining a slot, the third side of the screen extending through the slot to engage the axle, the axle engaging a spring mechanism at one end thereof, the spring mechanism being biased to hold the screen in the wind up position, the speed reducer being mounted at the other end of the axle;
    *wherein said speed reducer includes*
        *a cylindrical hollow housing having a shaft extending coaxially and rotatable mounted therewithin,*
        *a plurality of vane blades attached to said shaft, and*
        *a plurality of inwardly extending rib elements that extend inwardly from said inner surface of said hollow housing;*
        *each of said plurality of vane blades extending outwardly and circumferentially in relation to said shaft and having a curvature causing greater resistance to rotation in one rotational direction than in an opposite rotational direction.*

13. The retractable screen system of claim 12 wherein: [the speed reducer comprises a hollow housing having a shaft extending coaxially and rotatable mounted therewithin, a plurality of ribs] *said inwardly extending rib elements* extend inwardly from the housing to add turbulence to the flow of the viscous fluid to increase the resistance thereof, each of the plurality of [ribs] *inwardly extending rib elements* being bent slightly, in one direction to further increase turbulence, [the resistance structure being a plurality of] *said* vane blades extending laterally from the shaft to the sidewall of the housing, the vane blades curving away from a radial orientation in one direction to further increase turbulence, the viscous fluid being contained within the housing, the housing being mounted to and rotating with the axle, the shaft extending outwardly from the housing, the shaft being fixedly mounted to prevent rotation thereof, whereby the housing rotates about the shaft.

\* \* \* \* \*